(12) United States Patent
Miftahullatif et al.

(10) Patent No.: US 12,461,160 B2
(45) Date of Patent: *Nov. 4, 2025

(54) BATTERY MANAGEMENT DEVICE, AND ELECTRIC POWER SYSTEM

(71) Applicant: Hitachi High-Tech Corporation, Tokyo (JP)

(72) Inventors: Emha Bayu Miftahullatif, Tokyo (JP); Toru Kouno, Tokyo (JP); Hiroya Fujimoto, Tokyo (JP); Yutaka Ueda, Tokyo (JP); Katsutoshi Kondo, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 140 days.

This patent is subject to a terminal disclaimer.

(21) Appl. No.: 18/287,485

(22) PCT Filed: Mar. 30, 2022

(86) PCT No.: PCT/JP2022/015907
§ 371 (c)(1),
(2) Date: Oct. 19, 2023

(87) PCT Pub. No.: WO2022/230576
PCT Pub. Date: Nov. 3, 2022

(65) Prior Publication Data
US 2024/0125860 A1   Apr. 18, 2024

(30) Foreign Application Priority Data

Apr. 28, 2021   (JP) .................. 2021-075636

(51) Int. Cl.
*G01R 31/3835* (2019.01)
*H01M 10/42* (2006.01)
*H02J 7/00* (2006.01)

(52) U.S. Cl.
CPC ...... *G01R 31/3835* (2019.01); *H01M 10/425* (2013.01); *H02J 7/0048* (2020.01); *H01M 2010/4271* (2013.01)

(58) Field of Classification Search
None
See application file for complete search history.

(56) References Cited

U.S. PATENT DOCUMENTS

2015/0212160 A1* 7/2015 Marsili .............. G01R 31/3835
324/427
2018/0156872 A1   6/2018 Oguma et al.
(Continued)

FOREIGN PATENT DOCUMENTS

JP   2018-80982 A    5/2018
JP   2018-91716 A    6/2018
(Continued)

OTHER PUBLICATIONS

International Search Report (PCT/ISA/210) issued in PCT Application PCT/JP2022/015907 dated Jun. 7, 2022 with English translation (4 pages).
(Continued)

*Primary Examiner* — Jas A Sanghera
(74) *Attorney, Agent, or Firm* — Crowell & Moring LLP

(57) ABSTRACT

The objective of the present invention is to provide a technology capable of estimating a battery condition in conjunction with charging/discharging operations of a battery, without employing dedicated equipment for estimating the condition of the battery. A battery management device according to the present invention identifies a first period and a subsequent second period in a rest period after a battery finishes discharging or charging, and uses an output voltage difference in the second period to estimate the condition of the battery (see FIG. 1).

10 Claims, 12 Drawing Sheets

(56) References Cited

U.S. PATENT DOCUMENTS

| | | | |
|---|---|---|---|
| 2018/0188330 A1* | 7/2018 | Yamamoto | G01R 31/386 |
| 2020/0088807 A1 | 3/2020 | Ikeda et al. | |
| 2021/0311129 A1* | 10/2021 | Yezerets | G01R 31/385 |
| 2022/0381846 A1 | 12/2022 | Miftahullatif et al. | |
| 2022/0390521 A1* | 12/2022 | Kim | G01R 31/3648 |
| 2023/0084079 A1* | 3/2023 | Kwak | G01R 31/392 |
| | | | 324/432 |
| 2023/0349981 A1* | 11/2023 | Miftahullatif | H01M 10/486 |
| 2024/0210485 A1* | 6/2024 | Kouno | G01R 31/389 |

FOREIGN PATENT DOCUMENTS

| | | |
|---|---|---|
| JP | 2018-156759 A | 10/2018 |
| JP | 2020-169943 A | 10/2020 |
| WO | WO 2021/065443 A1 | 4/2021 |
| WO | WO 2022/024235 A1 | 2/2022 |

OTHER PUBLICATIONS

Japanese-language Written Opinion (PCT/ISA/237) issued in PCT Application No. PCT/JP2022/015907 dated Jun. 7, 2022 with English translation (6 pages).
Extended European Search Report issued in European Application No. 22795492.2 dated Apr. 4, 2025 (11 pages).

* cited by examiner

FIG. 3

| T | c_Rn_T_1 | c_Rn_T_2 | ... |
|---|---|---|---|
| T1 | ... | ... | ... |
| T2 | ... | ... | ... |
| ... | ... | ... | ... |

T: measurement temperature

| I | c_Rn_I_1 | c_Rn_I_2 | ... |
|---|---|---|---|
| I1 | ... | ... | ... |
| I2 | ... | ... | ... |
| ... | ... | ... | ... |

I: discharge current

| V | c_Rn_V_1 | c_Rn_V_2 | ... |
|---|---|---|---|
| V1 | ... | ... | ... |
| V2 | ... | ... | ... |
| ... | ... | ... | ... |

V: voltage at discharge end

BATTERY MANAGEMENT DEVICE, AND ELECTRIC POWER SYSTEM

TECHNICAL FIELD

The present disclosure relates to a technique for managing battery state.

BACKGROUND ART

Impedance measurement is known as a method for estimating battery state. Patent Literature 1 below describes a technical problem as: To accurately estimate the state of a battery by using impedance. This document also describes a solution for the problem as: A battery state estimation device (100) comprising: an acquisition unit (110) configured to acquire a complex impedance of a battery at a plurality of different temperatures; and A calculation unit configured to calculate, as a slope of the complex impedance, a slope of a straight line connecting values of the acquired plurality of complex impedances at a first predetermined frequency (1 20), storage means (130) for storing in advance the relationship between the slope of the complex impedance and the battery state of the battery, and estimation means (140) for estimating the battery state based on the calculated slope of the complex impedance and the stored relationship (refer to Abstract).

CITATION LIST

Patent Literature

Patent Literature 1: JP 2018-091716 A

SUMMARY OF INVENTION

Technical Problem

In order to perform impedance measurement, it is necessary to apply alternating current waves to a measured target. This requires an equipment for the measurement, and thus it is difficult to perform impedance measurement during merely charging or discharging the rechargeable battery. This is because charging or discharging the rechargeable battery is a direct current process. If it is possible to estimate whether the rechargeable battery has defects during charging or discharging the rechargeable battery, such estimation is beneficial because there will be no need for preparing the equipment for impedance measurement.

The present disclosure is made in the light of the technical problem above. It is an objective of this disclosure to provide a technique that can estimate a battery state along with charging or discharging the battery without using equipment dedicated for estimating the battery state.

Solution to Problem

A battery management device according to this disclosure: identifies a first period in a rest period after charging or discharging a battery and a second period after the first period; and estimates a state of the battery using a difference of an output voltage in the second period.

Advantageous Effects of Invention

With the battery management device according to this disclosure, it is possible to estimate a battery state along with charging or discharging the battery without using equipment dedicated for estimating the battery state.

BRIEF DESCRIPTION OF DRAWINGS

FIG. 3 is a diagram illustrating a modified example of the relationship data.

DESCRIPTION OF EMBODIMENTS

Embodiment 1

Figure 1:
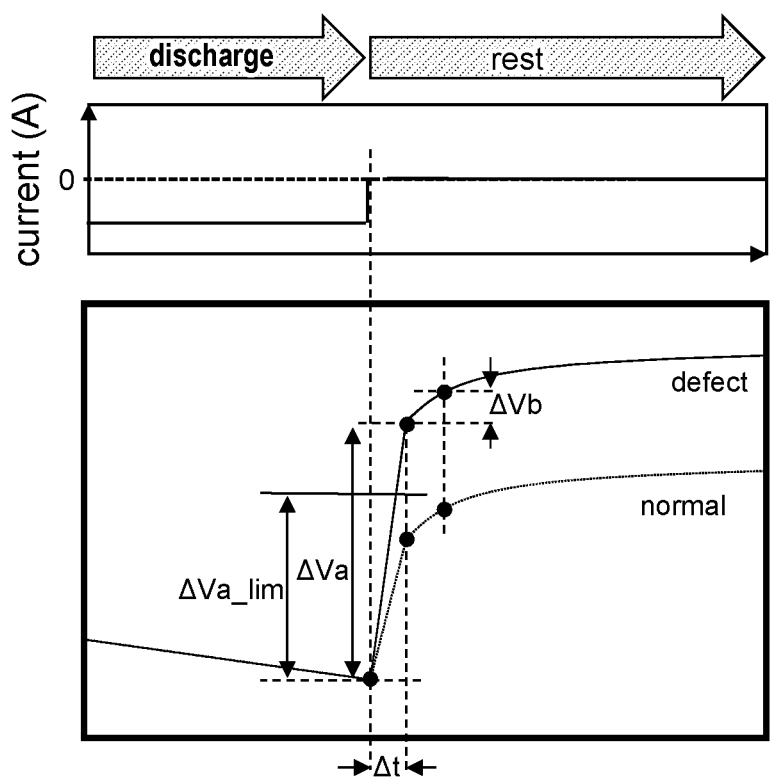
FIG. 1 is a graph illustrating a temporal variation of output voltage from a battery in a rest period after finishing discharge operation of the battery.

FIG. 1 is a graph illustrating a temporal variation of output voltage from a battery in a rest period after finishing discharge operation of the battery. When finishing the discharge operation, the output voltage rapidly increases, and then slowly increases. The period where the output voltage rapidly increases is referred to as a first period. The period thereafter where the output voltage slowly increases is referred to as a second period. The time length of the first period is $\Delta t$. The difference of the output voltage between a start time point of the first period and an end time point of the first period is $\Delta Va$. The difference of the output voltage between a start time point of the second period and an end time point of the second period is $\Delta Vb$.

According to knowledge acquired by the author of this disclosure, it is found that the battery highly likely has a defect (not in a normal state) when $\Delta Va$ is at or above $\Delta Va\_lim$. In addition, it is found that $\Delta Va\_lim$ is a first order function (typically proportional) of $\Delta Vb$. In an embodiment 1 of this disclosure, using such relationship, a method will be described that predicts whether the battery has a defect (alternatively whether the battery is about to have a defect) based on a ratio of $\Delta Va$ to $\Delta Vb$.

Figure 2:
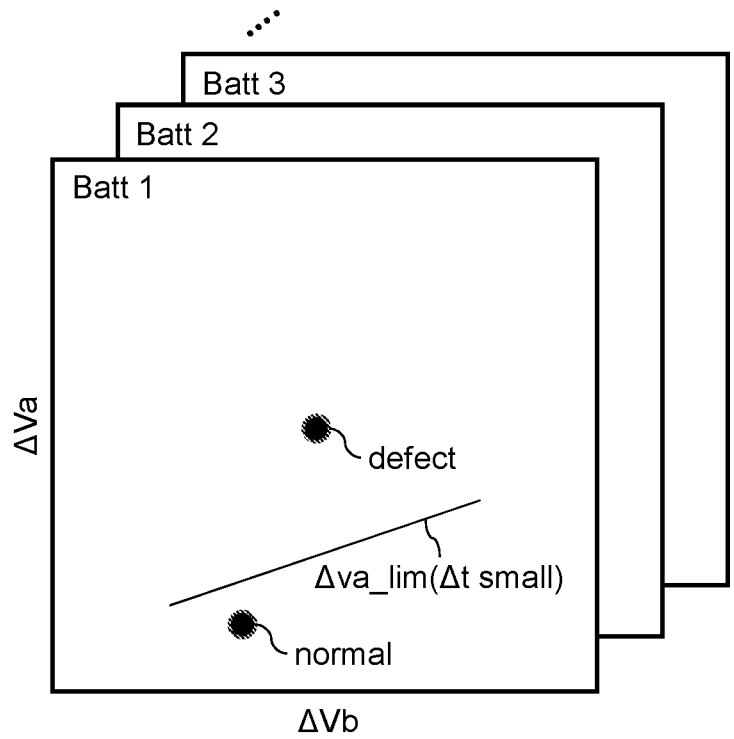
FIG. 2 is an example of relationship data that describes a relationship between $\Delta Vb$ and $\Delta Va\_lim$.
Figure 2:
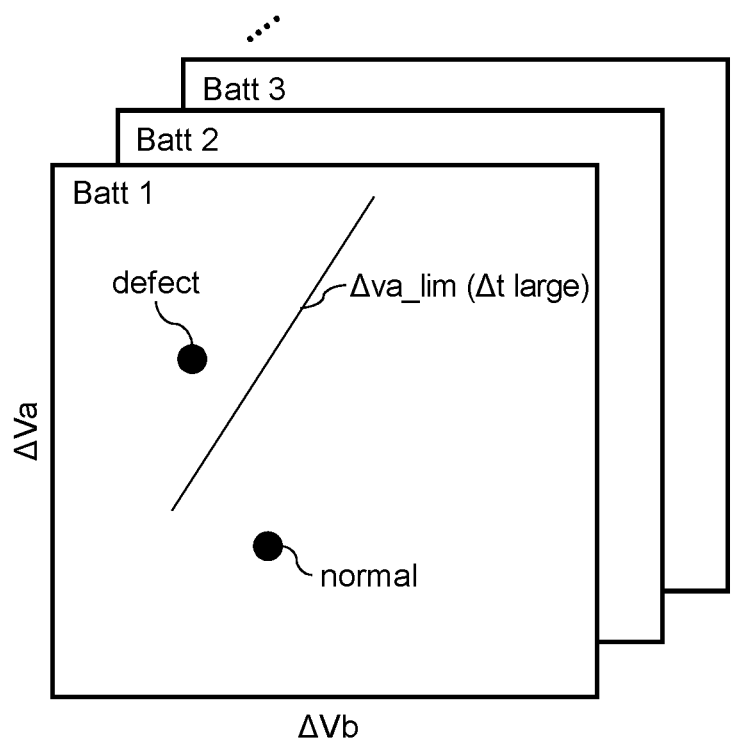

FIG. 2 is an example of relationship data that describes a relationship between $\Delta Vb$ and $\Delta Va\_lim$. $\Delta Vb$ and $\Delta Va\_lim$ are typically in a proportional relationship. In other words, as $\Delta Vb$ is large, the normal range of $\Delta Va$ is also large. If $\Delta Va$ is at or above the normal range (i.e. $\Delta Va \geq \Delta Va\_lim$), it is estimated that the battery has a defect. Explaining in accordance with FIG. 2, when plotting actually measured values of ΔVa and ΔVb, ΔVa is abnormal if ΔVa is larger than the solid line In FIG. 2.

The relationship between ΔVb and ΔVa_lim varies also depending on the length of Δt. Then FIG. 2 shows an example describing the relationship between them for each of values of Δt. In addition, similar relationship data may be prepared for each of types of battery cell. The relationship between these values may be acquired from previously performed experiments, for example.

As shown in FIG. 2, ΔVa_lim can be defined depending on values of Δt and of ΔVb. Thus the timing for actually measuring these values can be freely determined to some extent. However, these values still should be measured in a period where the defect of the battery appears well. For example, in a period where the output voltage rapidly increases immediately after the dormant state starts, it is not desirable to actually measure both of ΔVa and ΔVb. Similarly, it is not desirable to actually measure both of them in a period where the temporal variation of the output voltage is stable in the rest period. Accordingly, although the timing for ΔVa and ΔVb can be freely determined to some extent, they should be acquired at a timing where a rapid increase and a slow increase of the output voltage can be seen, as shown in FIG. 1. These are dependent on the characteristic of the battery. Thus an appropriate timing may be defined for each of battery types.

The first period and the second period may overlap with each other partially. In other words, as long as the second period ends after the end time point of the first period, such period can be employed as the second period. The start time point of the first period may be after the end time point of the rest period. In other words, it is sufficient as long as the rest period encompasses both of whole of the first period and whole of the second period. It is noted that the end time point of the second period is after the end time point of the first period.

FIG. 3 is a diagram illustrating a modified example of the relationship data. The function representing the relationship between ΔVb and ΔVa_lim may vary depending on at least one of: battery temperature T, discharge current I of battery, or voltage V at end of discharge of battery. In such cases, the functional parameters may be defined for each value of T, I, and V. ΔVa_lim may be calculated using the functional parameters corresponding to actually measured values of them. Therefore, the function f that represents the relationship between ΔVb and ΔVa_lim in such cases is defined as below.

$$\Delta Va\_lim = f($$
$$\Delta Vb,$$
$$c\_Rn\_T\_1, c\_Rn\_T\_2, \ldots,$$
$$c\_Rn\_I\_1, c\_Rn\_I\_2, \ldots,$$
$$c\_Rn\_V\_1, c\_Rn\_V\_2, \ldots$$
$$)$$

Since ΔVa_lim is a function of ΔVb, the function f has ΔVb as an argument. The function f further includes one or more of parameters c_Rn_T that varies depending on temperature T. Similarly, the function f includes one or more of parameters c_Rn_I that varies depending on electrical current I, and one or more of parameters c_Rn_V that varies depending on voltage V.

Figure 4:
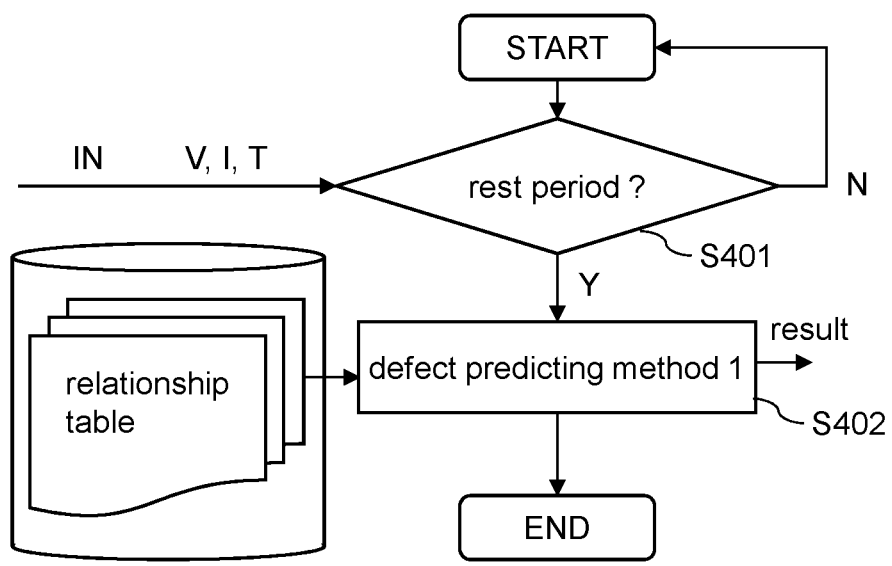
FIG. 4 is a flowchart that explains a procedure for estimating whether the battery has a defect.

FIG. 4 is a flowchart that explains a procedure for estimating whether the battery has a defect. Hereinafter, each step in FIG. 4 will be described.

(FIG. 4: Step S401)

It is determined whether it is a rest period after charging or a rest period after discharging. If it is not the rest period now, this flowchart terminates. If it is the rest period, the flowchart proceeds to S402. It can be determined whether it is the rest period after discharging, by such as (a) the output current from the battery varies from a negative value (I<0) to zero; (b) the output current varies from a negative value to a value around zero and is stable ({I}<threshold).

(FIG. 4: Step S401: Additional Note)

When defining functional parameters for each value of T, I, and V as described in FIG. 3, these values may be acquired in this step (or in subsequent step). These values may be acquired from a managing unit installed for each of battery cells.

(FIG. 4: Step S402)

Actually measured values of ΔVa and ΔVb are acquired. A ratio of ΔVa to ΔVb is calculated. If this ratio is at or above ΔVa_lim corresponding to the actually measured value of ΔVb, it is estimated that the battery has a defect. The estimated result is outputted.

Embodiment 1: Summary

In the embodiment 1, a ratio of voltage difference ΔVa in the first period to voltage difference ΔVb in the second period is calculated. If the ratio is at or above ΔVa_lim, it is estimated that the battery has a defect. Accordingly, it is possible to estimate whether the battery is in a normal state even without preparing equipment used for such as impedance measurement.

In the embodiment 1, the relationship between ΔVa_lim and ΔVb can be defined for each values of Δt. Accordingly, it is possible to acquire actually measured values of ΔVa or ΔVb at a relatively free timing.

Embodiment 2

Figure 5:
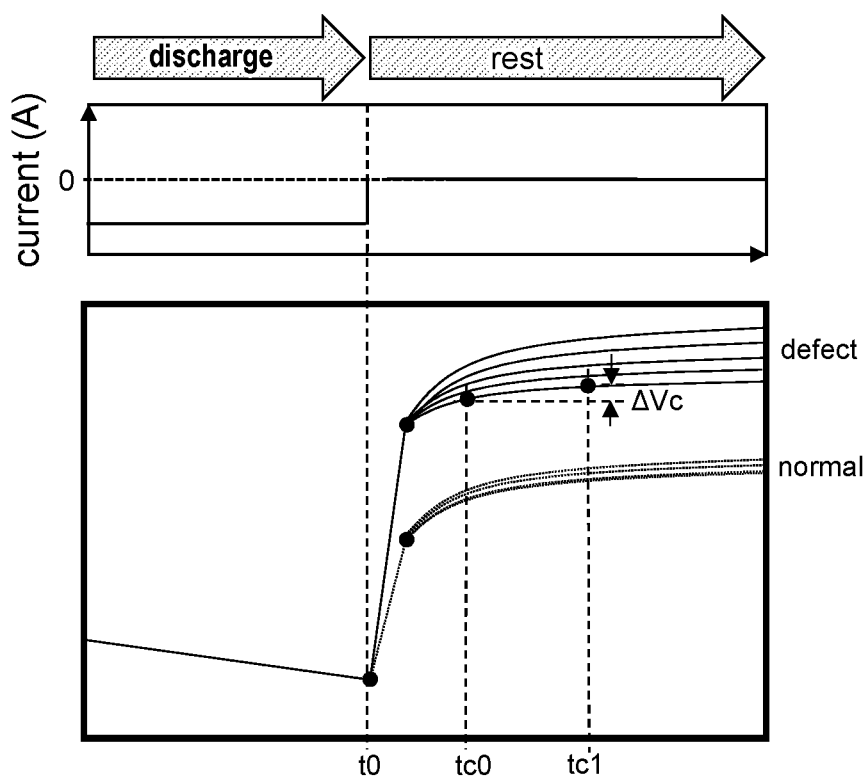
FIG. 5 is a graph that compares variations of temporal change of output voltage in the rest period after discharging operation between normal batteries and defective batteries.

FIG. 5 is a graph that compares variations of temporal change of output voltage in the rest period after discharging operation between normal batteries and defective batteries. The normal batteries exhibit approximately same differences ΔVc of output voltage regardless of the number of times of measurement, in a third period (time tc0-tc1 in FIG. 5) where the temporal variation of output voltage is stable. On the other hand, the author of this disclosure found that for defective batteries, ΔVc significantly varies for each of measurement. Thus in an embodiment 2 of this disclosure, a procedure will be described that estimates whether the battery has a defect based on the variation of ΔVc.

It is desirable to set the third period at a timing when the output voltage of defective battery significantly varies for each of measurement. For example, a period may be used as the third period, which is within one second from starting the rest period and which is next to the second period explained in the embodiment 1. It is not necessary that the end time point of the second period is same as the start time point of the third period. For example, the second period and the third period may partially overlap with each other. Alternatively, an interval may be placed between the end time point of the second period and the start time point of the third period.

A procedure for calculating ΔVc will be described below. An actually measured value of voltage change ΔVc is acquired for same batteries in the same third period (i.e. a voltage difference is acquired between same time points tc0 and tc1 for the same batteries). A standard deviation σ of ΔVc is calculated for each acquisition. If σ is at or above a threshold σ_lim, it is estimated that the battery has a defect.

σ_lim may be determined using a measured result of a battery which is not degraded. For example, a standard deviation σ_new of ΔVc is calculated for a new battery, and σ_lim may be determined as σ_lim=3σ new. Alternatively, σ_lim may be determined according to rule of thumb such as experimental results. The value of σ_lim may be described in the relationship data as in the embodiment 1.

Figure 6:
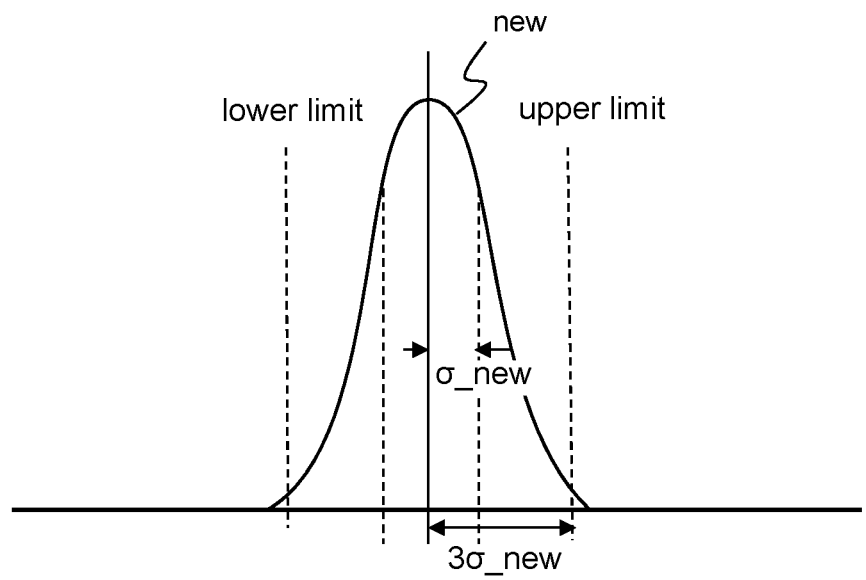
FIG. 6 is a schematic diagram that illustrates estimating whether there is a defect using $\sigma\_lim$.
Figure 6:
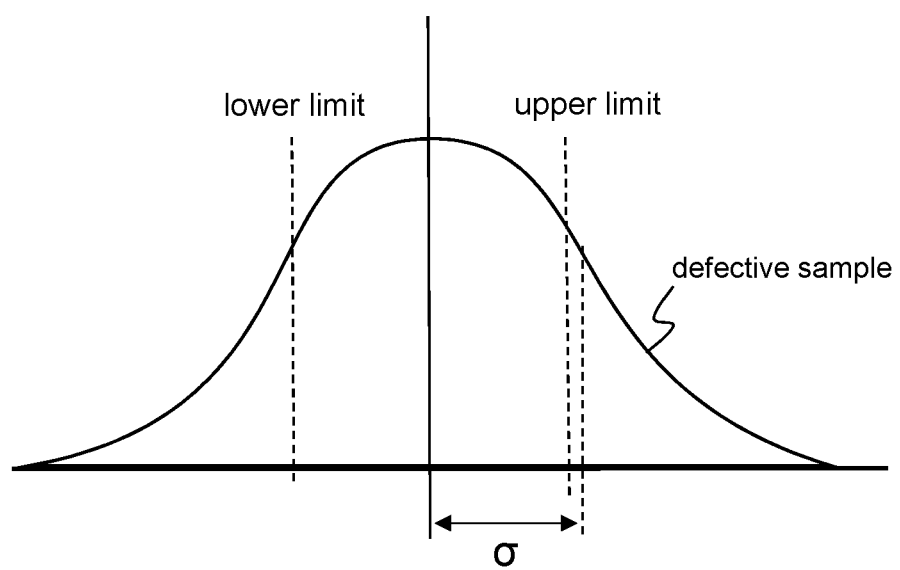

FIG. 6 is a schematic diagram that illustrates estimating whether there is a defect using σ_lim. If a fluctuation of ΔVc (standard deviation σ) is within three times of a standard deviation σ_new of a new battery, such fluctuation may be approximately within a normal range. On the other hand, if σ fluctuates over the range of 3σ_new, it is estimated that the battery has a defect.

Embodiment 2: Summary

In the embodiment 2, if a voltage variation (standard deviation σ) in the third period is at or above σ_lim, it is estimated that the battery has a defect. Accordingly, as in the embodiment 1, it is possible to estimate whether the battery is in a normal state even without preparing equipment used for such as impedance measurement.

Embodiment 3

Figure 7:
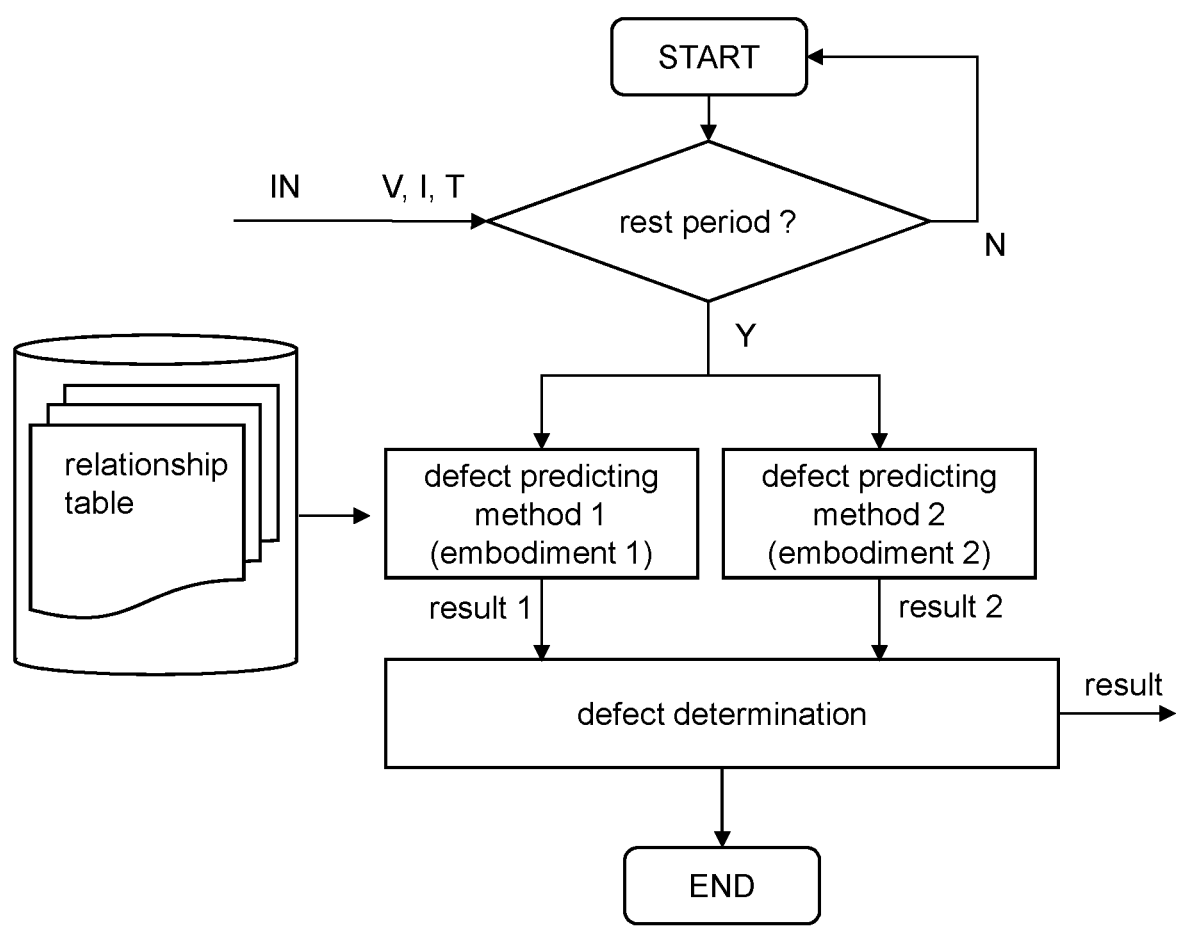
FIG. 7 is a flowchart that explains a procedure for estimating whether the battery has a defect in an embodiment 3.

FIG. 7 is a flowchart that explains a procedure for estimating whether the battery has a defect in an embodiment 3 of this disclosure. The methods explained in the embodiments 1-2 are performed respectively, and normality of battery is ranked according to the results of the methods, thereby it is possible to estimate the normality of battery. For example, the normality of battery may be estimated as below. Those ranking methods are for examples only, and other ranking method may be employed.
  (a) If the battery is estimated as normal by the method in the embodiment 1, and is estimated as normal by the method in the embodiment 2, the battery is estimated as grade A (lowest defect level: highest normality).
  (b) If the battery is estimated as normal by the method in the embodiment 1, and is estimated as defective by the method in the embodiment 2, the battery is estimated as grade B (second lowest defect level).
  (c) If the battery is estimated as defective by the method in the embodiment 1, and is estimated as normal by the method in the embodiment 2, the battery is estimated as grade C (second highest defect level).
  (d) If the battery is estimated as defective by the method in the embodiment 1, and is estimated as defective by the method in the embodiment 2, the battery is estimated as grade D (highest defect level: lowest normality).

Embodiment 4

An embodiment 4 of this disclosure explains a configuration example of a battery management device that implements methods for estimating whether the battery has a defect explained in the embodiments 1-3.

Figure 8:
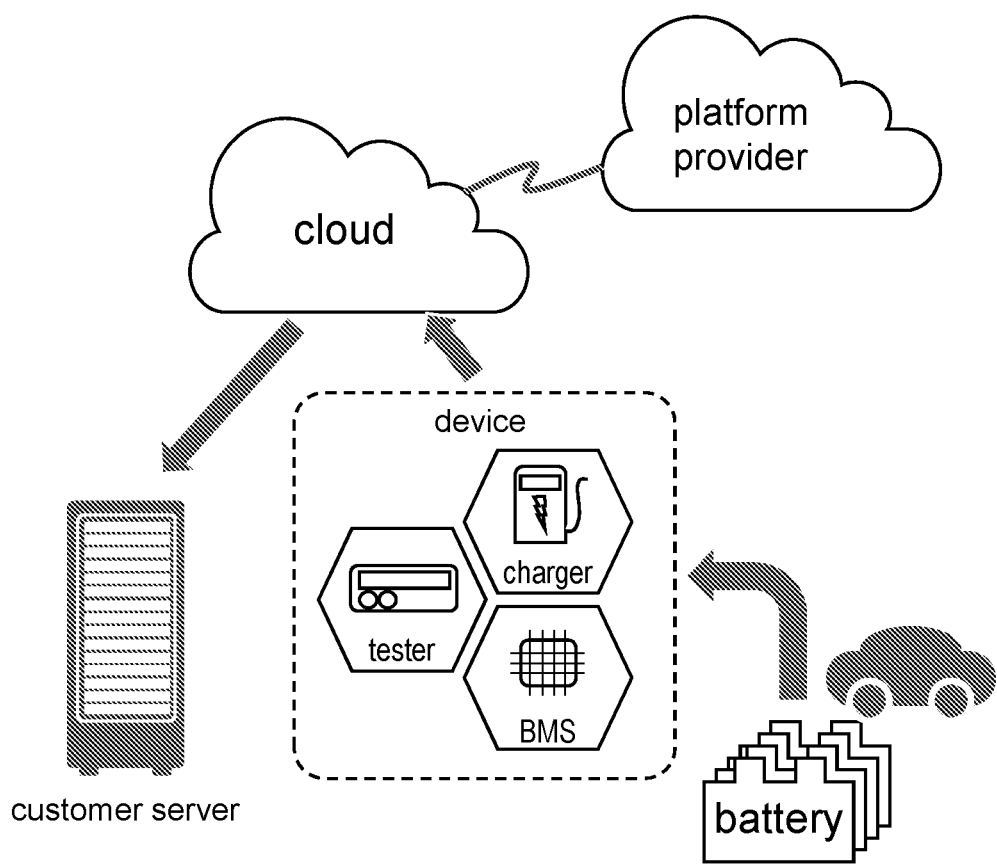
FIG. 8 is a schematic diagram that exemplifies an application of the battery management device according to an embodiment 4.

FIG. 8 is a schematic diagram that exemplifies an application of the battery management device according to the embodiment 4. The battery management device estimates whether the battery has a defect according to the procedure of flowcharts explained in the embodiments 1-3. The battery (e.g. battery cell, battery module, battery pack, etc.) which needs charge or discharge may be connected to various devices, such as a tester, a BMS (battery management system), a battery charger, and so on. When the battery is connected to these devices, the battery is in any one of charge operation/discharge operation/dormant state. Depending on the place where the algorithm for estimating the defect is performed, the presence or absence of defect may be calculated on the devices above or on a computer that is connected via a network such as on a cloud server. The benefit to calculate on a device to which the battery is connected is that the battery state (voltage outputted from battery, electric current outputted from battery, battery temperature, etc.) can be acquired highly frequently.

The presence or absence of defect calculated on a cloud system may be sent to a computer owned by a user. The user computer may provide this data to a specific application such as inventory management. The presence or absence of defect calculated on the cloud system may be stored in a database of a cloud platform provider, for use in another application. Such another application may include optimization of exchange route of electric vehicle, energy management, and so on.

Figure 9:
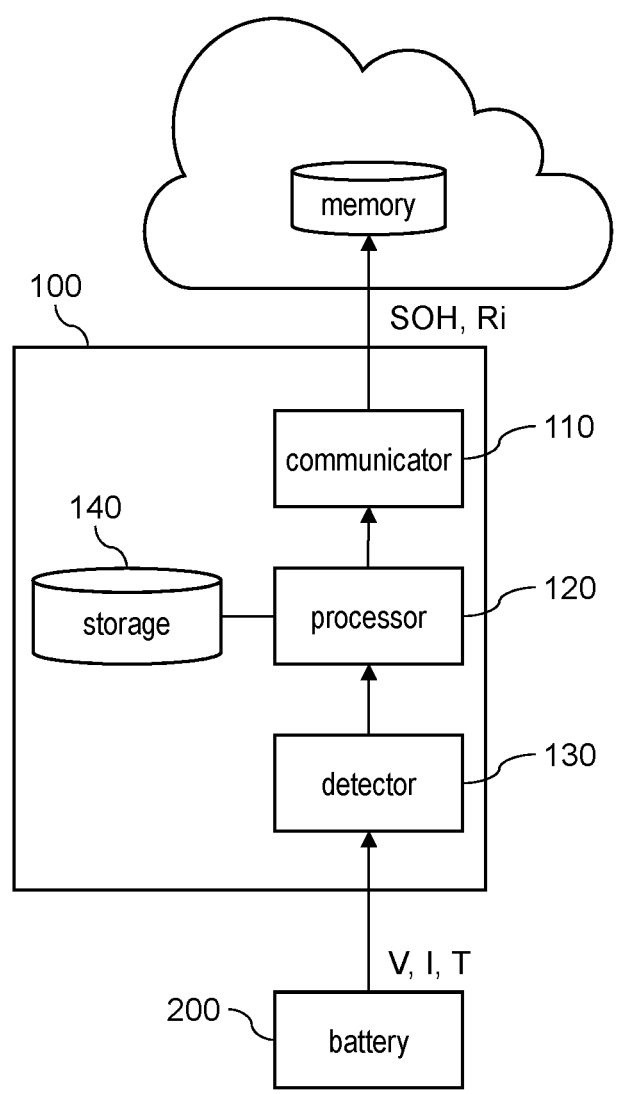
FIG. 9 is a diagram illustrating a configuration example of the battery management device 100 according to the embodiment 4.

FIG. 9 is a diagram illustrating a configuration example of the battery management device 100 according to the embodiment 4. The battery management device 100 in FIG. 9 is connected to a battery 200. The battery management device 100 is a device that receives electric power from the battery 200. The battery management device 100 corresponds to the tester in FIG. 8. The battery management device 100 includes a communicator 110, a processor 120, a detector 130, and a storage unit 140.

The detector 130 acquires a detected value V of voltage outputted from the battery 200, and a detected value I of electrical current outputted from the battery 200. Optionally, the detector 130 may acquire a detected value T of temperature of the battery 200. These detected values may be detected by the battery 200 itself and be notified to the detector 130. Alternatively, these detected values may be detected by the detector 130. Details of the detector 130 will be described later.

The processor 120 estimates presence or absence of defect of the battery 200, using the detected values acquired by the detector 130. The estimating procedure is as explained in the embodiments 1-3. The communicator 110 sends, to outside of the battery management device 100, the presence or absence of defect estimated by the processor 120. For example, they may be sent to a memory included in the cloud system. The storage unit 140 stores the relationship data explained in the embodiments 1-3.

The processor 120 may be configured by hardware such as circuit device implementing the functionality of the processor 120. Alternatively, the processor 120 may be configured by software implementing the functionality of the processor 120 and by processing devices such as CPU (Central Processing Unit) executing the software.

Figure 10:
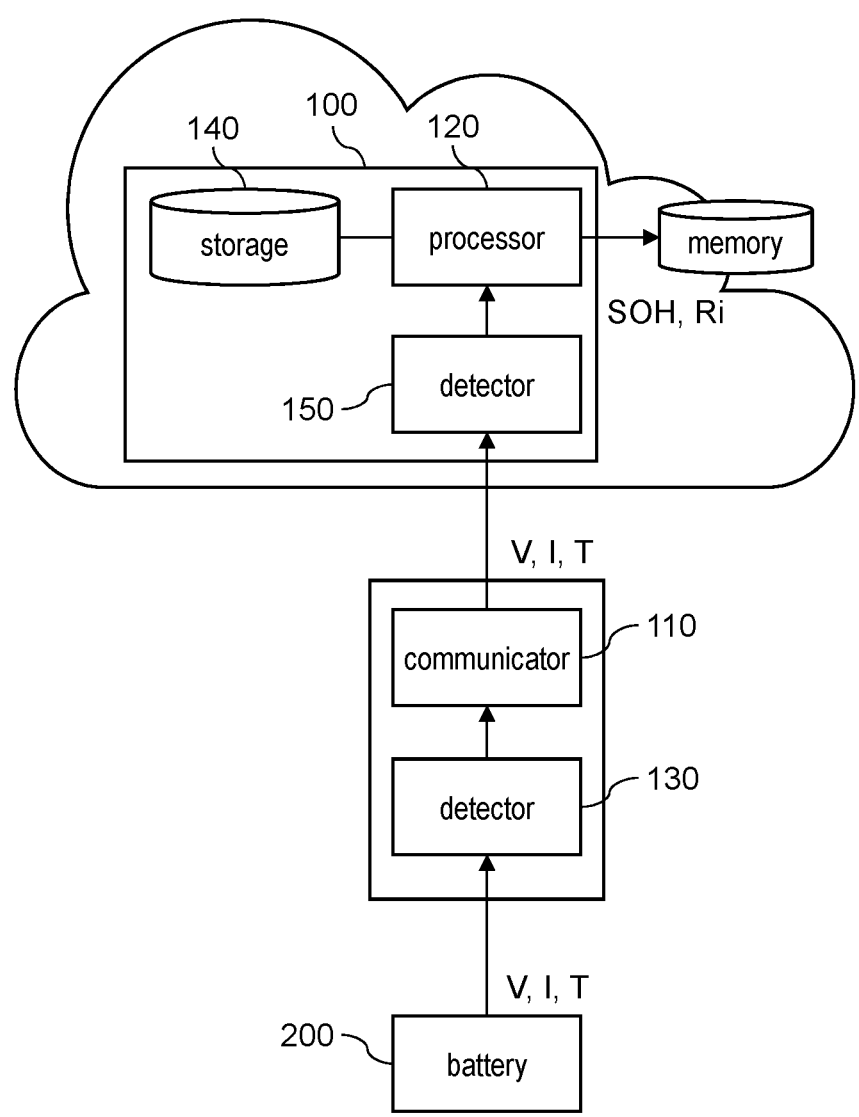
FIG. 10 is a diagram illustrating another configuration example of the battery management device 100.

FIG. 10 is a diagram illustrating another configuration example of the battery management device 100. The battery management device 100 is not necessarily a device that receives electric power by directly connecting to the battery 200. FIG. 10 illustrates a form where the battery management device 100 does not include the communicator 110 and the detector 130 described in FIG. 9. The battery management device 100 in FIG. 10 acquires the voltage V, the electrical current I, and the temperature T of the battery 200 from the communicator 110. Specifically, the detector 150 included in the battery management device 100 receives these detected values via a network. Then the processor 120 calculates presence or absence of defect using these detected values.

Figure 11:
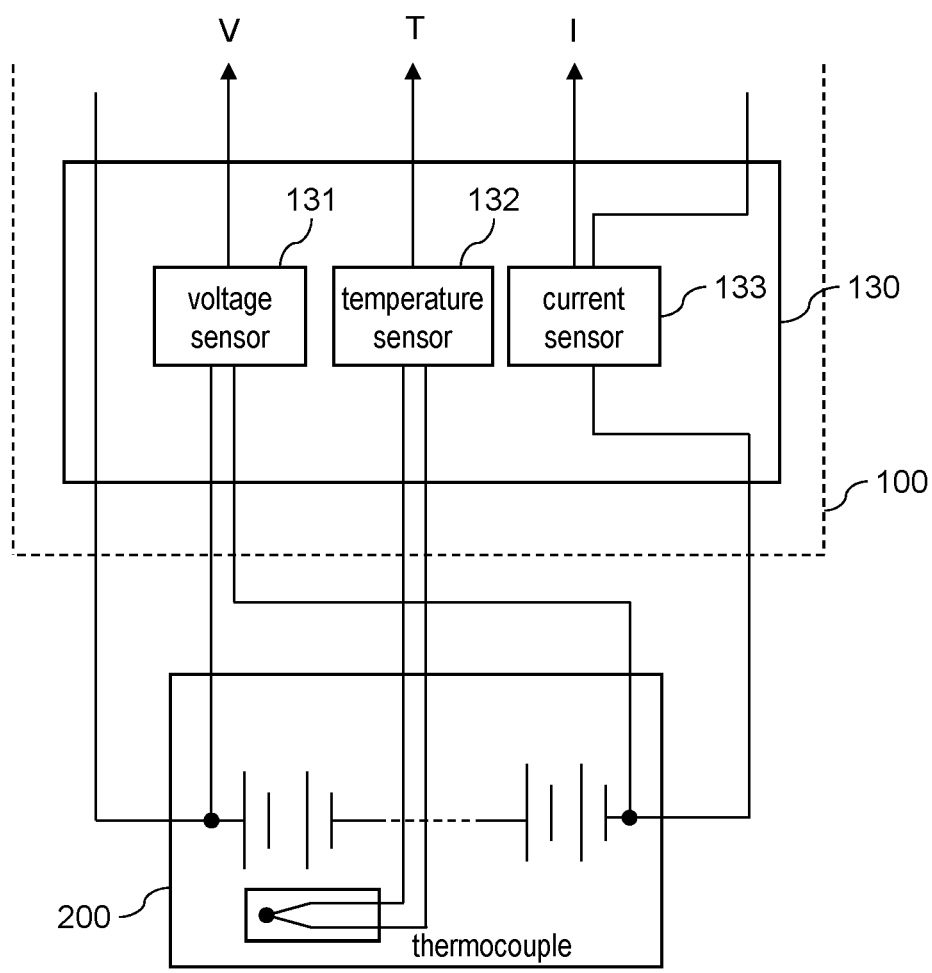
FIG. 11 illustrates a configuration example where a detector 130 is connected to a battery 200.

FIG. 11 illustrates a configuration example where the detector 130 is connected to the battery 200. The detector 130 may be configured as a part of the battery management device 100, or may be configured as another module separated from the battery management device 100. The detector 130 includes a voltage sensor 131, a temperature sensor 132, and a current sensor 133 for acquiring the voltage V, the temperature T, and the current I when charging or discharging the battery 200.

The voltage sensor 131 measures a voltage across terminals (output voltage from the battery 200) of the battery 200. The temperature sensor 132 is connected to a thermocouple included in the battery 200, for example, and measures the temperature of the battery 200 via the thermocouple. The current sensor 133 is connected to a terminal of the battery 200, and measures the electrical current outputted from the battery 200. The temperature sensor 132 is optional, and is not necessarily included in the configuration.

Figure 12:
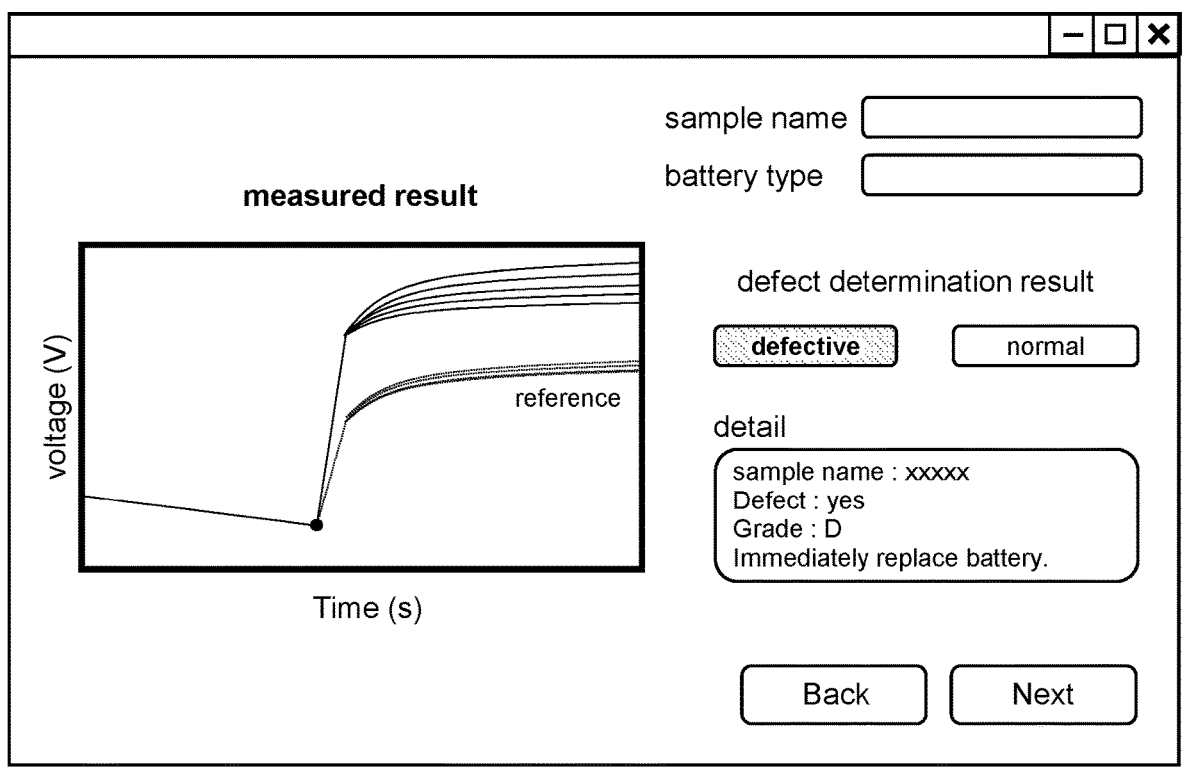
FIG. 12 is an example of a user interface presented by the battery management device 100.

FIG. 12 is an example of a user interface presented by the battery management device 100. The user interface may be presented on a display device, for example. The user interface presents a calculated result by the processor 120. The user interface in FIG. 12 presents a temporal variation of output voltage in the rest period, as well as an estimated result on whether the battery has a defect.

Modification of Present Disclosure

The present disclosure is not limited to the embodiments as described above, but includes various modifications. For example, the embodiments are described in detail for readily understanding of the present disclosure which is not necessarily limited to the one equipped with all structures as described above. It is possible to replace a part of the structure of one embodiment with the structure of another embodiment. The structure of one embodiment may be provided with an additional structure of another embodiment. It is further possible to add, remove, and replace the other structure to, from and with a part of the structure of the respective embodiments.

In the embodiments above, the relationship data may be stored in the storage unit 140 from the beginning, or may be acquired from a device other than the battery management device 100 when performing the flowcharts in the embodiments. A temporal change of output voltage for a non-degraded battery may be acquired from a device other than the battery management device 100, or may be actually measured by the battery management device 100 itself.

In the embodiments above, presence or absence of defect is estimated in the rest period after discharging the rechargeable battery. However, as long as a temporal change of output voltage appears which corresponds to presence or absence of defect in the rest period after charging the battery, the presence or absence of defect can be estimated as in the embodiments above. It depends on the battery characteristic whether a voltage change appears which corresponds to presence or absence of defect in the rest period after discharging, in the rest period after charging, or in both of them. Therefore, depending on the battery characteristic, the presence or absence of defect may be estimated in any one of them.

In the embodiments above, the battery management device 100 and the battery 200 may be configured as an electric power grid system configured by a plurality of the batteries 200. The battery management device 100 may estimate presence or absence of defect of battery and may control the behavior of the battery. Alternatively, another device may control the battery 200.

REFERENCE SIGNS LIST

100: battery management device
110: communicator
120: processor
130: detector
140: storage unit
200: battery

The invention claimed is:

1. A battery management device that manages a state of a battery, comprising:
   a detector that acquires a detected value of a voltage outputted from the battery; and
   a processor that estimates a state of the battery,
   wherein the processor identifies a first period from a start time point at or after an end time point when the battery finishes charging or discharging to a first time point when a first duration has elapsed from the start time point,
   wherein the processor identifies a second period that starts at a time point after the end time point and that ends at a second time point after an end time of the first period,
   wherein the processor acquires, as a second period difference, a difference of an output voltage of the battery from start of the second period to end of the second period,
   wherein the processor acquires a relationship between the second period difference and a state of the battery,
   wherein the processor refers to the relationship using the second period difference, thereby estimating a state of the battery,
   wherein the processor acquires, as a first period difference, a difference of the output voltage from start of the first period to end of the first period, and
   wherein if a ratio of the first period difference to the second period difference is at or above a first threshold, the processor estimates that the battery is not in a normal state.

2. The battery management device according to claim 1, the battery management device further comprising a storage unit that stores data describing a relationship between the second period difference and the first threshold for each of time lengths of the first period,
   wherein the processor refers to the data using an actually measured value of a time length of the first period, thereby acquiring the first threshold corresponding to an actually measured value of time length of the first period, and
   wherein the processor compares the acquired first threshold with the ratio.

3. The battery management device according to claim 1,
   wherein the processor acquires the second period difference multiple times,
   wherein the processor calculates a first standard deviation of each of the second period differences, and
   wherein if the first standard deviation is at or above a second threshold, the processor estimates that the battery is not in a normal state.

4. The battery management device according to claim 3,
wherein the processor acquires the second period difference multiple times for the battery that is not degraded, and calculates a second standard deviation of the acquired second period differences, and
wherein the processor uses, as the second threshold, a three times of the second standard deviation.

5. The battery management device according to claim 1,
wherein the processor identifies a third period that starts at a time point after the end time point and that ends at a third time after an end time of the second period,
wherein the processor acquires multiple times, as a third period difference, a difference of output voltage of the battery from start of the third period to end of the third period,
wherein the processor calculates a first standard deviation of each of the third period differences, and
wherein if the first standard deviation is at or above a second threshold, the processor estimates that the battery is not in a normal state.

6. The battery management device according to claim 5,
wherein the processor estimates normality of the battery according to a combination of: a result of estimating whether the battery is in a normal state by comparing the ratio with the first threshold; a result of estimating whether the battery is in a normal state by comparing the first standard deviation with the second threshold.

7. The battery management device according to claim 1,
wherein the processor acquires, from a device other than the battery management device, data describing the relationship, thereby acquiring the relationship.

8. The battery management device according to claim 1,
wherein the processor actually measures the second period difference for the battery that is not degraded, thereby acquiring the relationship.

9. The battery management device according to claim 1,
the battery management device further comprising a user interface that presents a processed result by the processor,
wherein the user interface presents at least one of:
 a temporal variation of the output voltage in the second period;
 a result acquired by the processor estimating a state of the battery.

10. An electric power system comprising:
the battery management device according to claim 1; and
the battery.

* * * * *